(12) United States Patent
Yaku et al.

(10) Patent No.: US 8,127,993 B2
(45) Date of Patent: Mar. 6, 2012

(54) REFLECTION TYPE ENCODER, SCALE THEREOF AND METHOD FOR PRODUCING SCALE

(75) Inventors: Toru Yaku, Kawasaki (JP); Atsushi Tominaga, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 503 days.

(21) Appl. No.: 12/227,431

(22) PCT Filed: Jun. 1, 2007

(86) PCT No.: PCT/JP2007/061222
§ 371 (c)(1),
(2), (4) Date: Nov. 18, 2008

(87) PCT Pub. No.: WO2008/146409
PCT Pub. Date: Dec. 4, 2008

(65) Prior Publication Data
US 2009/0316155 A1    Dec. 24, 2009

(51) Int. Cl.
*G06K 7/14* (2006.01)
(52) U.S. Cl. ......... 235/454; 235/470; 235/490; 235/494
(58) Field of Classification Search .................. 235/454, 235/470, 490, 494
See application file for complete search history.

(56) References Cited

U.S. PATENT DOCUMENTS

| | | | |
|---|---|---|---|
| 4,286,871 A * | 9/1981 | Erickson | 355/133 |
| 5,430,546 A | 7/1995 | Huber | |
| 5,838,653 A * | 11/1998 | Fan et al. | 369/275.1 |
| 6,671,092 B2 * | 12/2003 | Flatscher | 359/436 |
| 7,256,938 B2 * | 8/2007 | Barton et al. | 359/576 |
| 2003/0137908 A1 | 7/2003 | Sakamoto et al. | |
| 2005/0207013 A1 * | 9/2005 | Kanno et al. | 359/576 |

FOREIGN PATENT DOCUMENTS

| | | |
|---|---|---|
| JP | A-58-144804 | 8/1983 |
| JP | U-61-161616 | 10/1986 |
| JP | A-4-221713 | 8/1992 |
| JP | A-2001-082984 | 3/2001 |
| JP | A-2004-037341 | 2/2004 |
| JP | A-2004-529344 | 9/2004 |
| JP | A-2005-201913 | 7/2005 |

\* cited by examiner

*Primary Examiner* — Daniel Hess
*Assistant Examiner* — Michael Andler
(74) *Attorney, Agent, or Firm* — Oliff & Berridge, PLC (57) ABSTRACT

A reflection type encoder, which receives a plurality of light-receiving signals from a single scale, includes a light source, a scale having a plurality of patterns formed thereon to which light is irradiated from the light source, and a light-receiving element for receiving light reflected from each of the plurality of patterns, wherein a plurality of patterns each having different thicknesses are formed on a single track of the scale by using a dielectric substance, light of a plurality of wavelengths each having different brightnesses in accordance with differences in the thickness of the dielectric substance is irradiated from the light source, and a light-receiving signal is obtained for the respective thicknesses of the dielectric substance. Therefore, the scale can be downsized by overlapping a plurality of patterns on the same track.

20 Claims, 10 Drawing Sheets

REFLECTION TYPE ENCODER, SCALE THEREOF AND METHOD FOR PRODUCING SCALE

TECHNICAL FIELD

The present invention relates to a reflection type encoder, a scale thereof and a method for producing the scale, and in particular to a reflection type encoder, a scale thereof and a method for producing the scale, which are preferably used for a photoelectric type encoder such as a linear encoder and a rotary encoder, etc., and capable of achieving an incremental (INC) pattern and an origin (ABS) pattern in a single track.

BACKGROUND ART

Metal such as chrome, etc., or a dielectric substance such as silicon oxide, etc., are formed, as a film, on the scale used in a photoelectric type encoder such as a linear encoder and a rotary encoder, and patterns are formed thereon.

In particular, in the incremental encoder, an origin pattern is provided in addition to an INC pattern, and for example, the origin pattern is forcedly passed through immediately after the power is turned on, and correction of a detection position is carried out.

Figure 1:
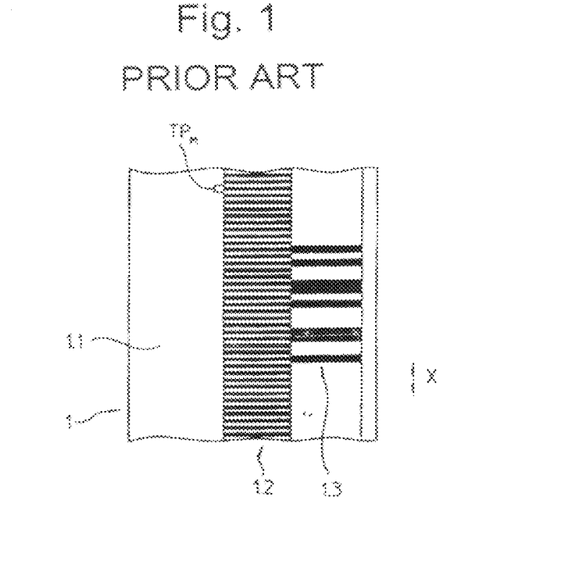
FIG. 1 is a plan view of a scale described in Patent Document 1.

Here, as an encoder in which an INC pattern and origin pattern (reference mark) or the absolute position (ABS) code pattern (collectively called "ABS pattern") are altogether disposed on the scale thereof, conventionally it has been proposed that, as shown in FIG. 1 corresponding to FIG. 2($a$) of Japanese Published Unexamined Patent Application No. 2001-82984 (Patent Document 1), for example, an INC pattern 1.2 of graduation cycle $TP_M$ and a reference mark (origin pattern) 1.3 are juxtaposed in parallel on the supporting body 1.1 of a scale 1. In FIG. 1, "X" denotes the measurement direction.

Figure 2:
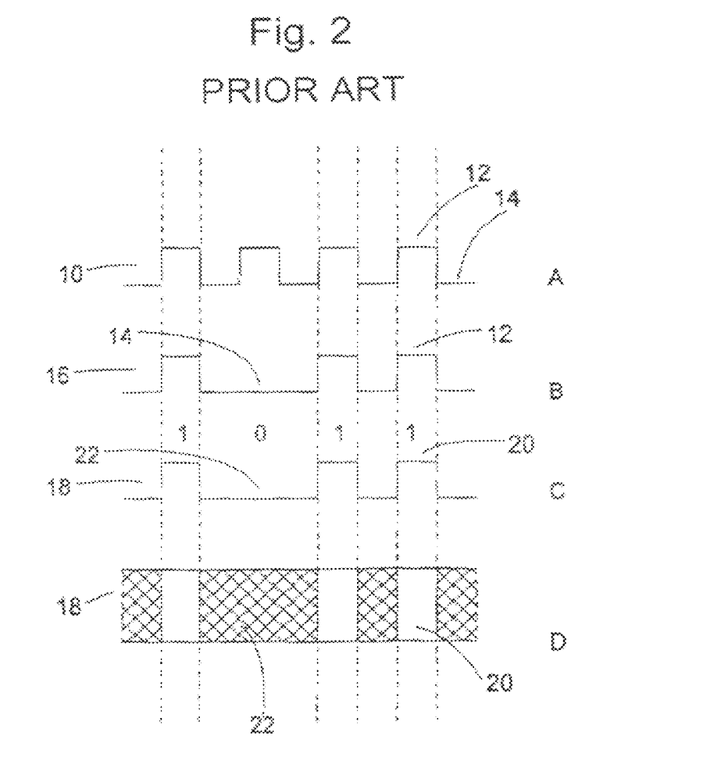
FIG. 2 is a view showing a configuration of the scale described in FIG. 1 of Patent Document 2.

Also, as shown in FIG. 2 corresponding to FIG. 1 of Japanese Translation of International Application (Kohyo) No. 2004-529344 (Patent Document 2), such a technology has been proposed, in which an INC pattern 10 shown in Stage A and having repeated patterns of reflection lines 12 and non-reflection lines 14 and an ABS pattern 16 shown in Stage B and having reflection lines 12 and non-reflection lines 14 are combined to make a scale 18, and as shown in Stages C and D, a part (22) of reflection lines 20 of the INC pattern 10 are fractured, and the fractured portion 22 is made into the ABS data. In FIG. 2, reference numeral 20 denotes a reflection line as it is in an original state, and 22 denotes a cut-off reflection line.

Figure 3:
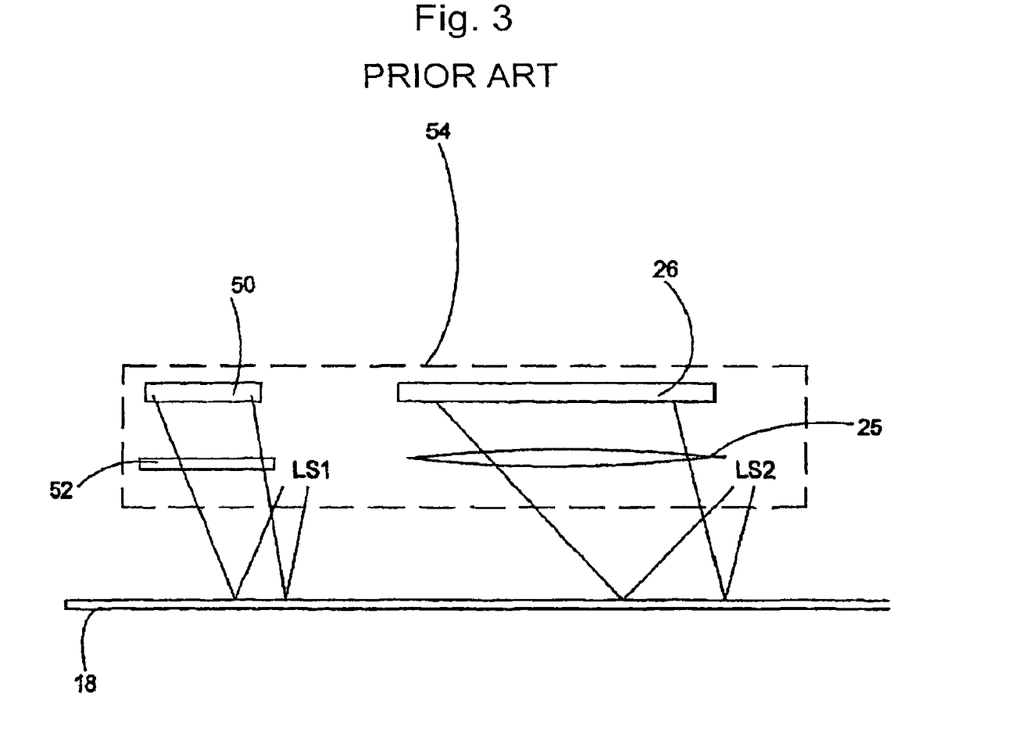
FIG. 3 is a side view showing the reading head and scale, which are described in FIG. 8 of Patent Document 2.

Further, in Patent Document 2, as shown in FIG. 3 corresponding to FIG. 8 thereof, a detector 50 of the INC pattern and a detector 26 of the ABS pattern are disposed in the axial direction of measurement apart from each other. In FIG. 3, reference symbols LS1 and LS2 denote light sources. Reference numeral 18 denotes a scale, 25 denotes an image-forming lens, 52 denotes an index grating, and 54 denotes a reading head.

Figure 4:
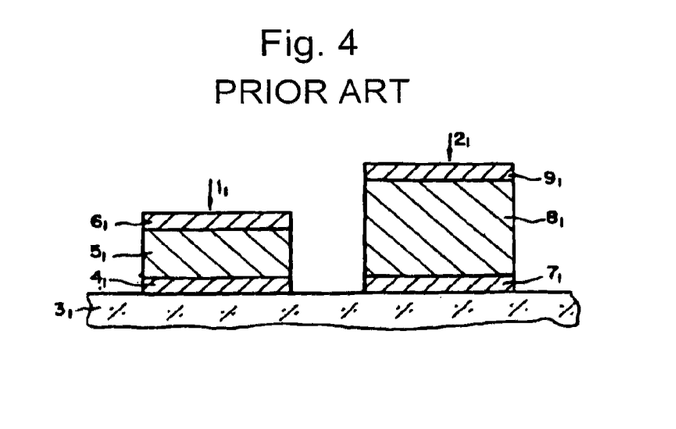
FIG. 4 is a sectional view showing a minute structure described in Patent Document 3.

On the other hand, although not being a technology pertaining to the encoder, such a technology has been proposed in Japanese Published Unexamined Patent Application No. S58-144804 (Patent Document 3) as shown in FIG. 4 corresponding to FIG. 1$a$ thereof, which heights of the multi-layered bodies $1_1$ and $2_1$ formed on a layer-supporting body $3_1$ in particular a minute map type recording supporting body having a multi-color minute structure are changed. In FIG. 4, reference numerals $4_1$, $6_1$, $7_1$ and $9_1$ denote metallic layers, reference numeral $5_1$ denotes a non-absorbing interference layer of an inorganic material corresponding to the first color tone, and reference numeral $8_1$ denotes a non-absorbing interference layer of an inorganic material corresponding to the second color tone.

However, in the technology according to Patent Document 1, it is necessary to widely set the width of the direction (the left and right direction in the drawing) orthogonal to the measurement direction X of the scale 1, wherein the scale and finally the encoder are large-sized.

In addition, if a part of the INC pattern is fractured as in FIG. 2 corresponding to FIG. 1 of Patent Document 2, the detection accuracy of INC displacement at a part free from any INC pattern is worsened.

Further, in the case of a configuration of FIG. 3 corresponding to FIG. 8 of Patent Document 2. Since there is a gap between the detector 50 and the detector 26, the interval between both of the detectors changes due to linear expansion of the members for holding both detectors when the temperature is subjected to fluctuation. Therefore, there is a problem that the detection value of the INC pattern is not in agreement with the detection value of the ABS pattern.

On the other hand, since Patent Document 3 has a multi-color minute structure with the pattern heights changed in a minute map, the technology does not pertain to the scale of a photoelectric encoder.

DISCLOSURE OF THE INVENTION

The present invention was developed to solve the problems in the prior arts, which are described above, and it is therefore an object of the present invention to downsize the scale of a reflection type encoder by overlapping a plurality of patterns on the same axis.

A first aspect of the invention of the present application is a reflection type encoder, which receives a plurality of light-receiving signals from a single scale, including a light source, a scale having a plurality of patterns formed thereon to which light is irradiated from the light source, and a light-receiving element for receiving light reflected from each of the plurality of patterns, wherein a plurality of patterns each having different thicknesses are formed on a single track of the scale by using a dielectric substance, light of a plurality of wavelengths each having different brightnesses in accordance with differences in the thickness of the dielectric substance is irradiated from the light source, and a light-receiving signal is obtained for the respective thicknesses of the dielectric substance.

A second aspect of the invention of the present application is that the encoder detects a first pattern at a first optical wavelength at which reflection light attenuates by a dielectric substance layer of a first thickness, and detects a second pattern at a second optical wavelength at which reflection light attenuates by a dielectric substance layer of a second thickness.

A third aspect of the invention of the present application is that a height of the dielectric substance layer is set so that the light quantity from the dielectric substance layer is minimized at the first optical wavelength and the light quantity from the dielectric substance layer is maximized at the second optical wavelength.

Also, a fourth aspect of the invention of the present application is that the plurality of patterns are an INC pattern and an ABS pattern.

Further, a fifth aspect of the invention of the present application is that the dielectric substance is silicon oxide.

Still further, a sixth aspect of the invention of the present application is that the thicknesses of the dielectric substance are 430 nm and 330 nm, and the wavelengths of the light source are 880 nm and 660 nm.

Also, a seventh aspect of the invention of the present application is that the detection center axis of the light-receiving element for detecting the incremental pattern is in agreement with the detection center axis of the light-receiving element for detecting the ABS pattern on the measurement axis.

In addition, an eighth aspect of the invention of the present application provides a scale of a reflection type encoder characterized in that a plurality of patterns each having different thicknesses are formed on a single track of the scale by using a dielectric substance.

Further, a ninth aspect of the invention of the present application provides a method for producing a scale, including the steps of, when forming a plurality of patterns each having different thicknesses on a single track of the scale by using a dielectric substance: forming a light reflection layer on a scale substrate; forming a dielectric substance layer with a first height thereon; forming and patterning a first resist pattern thereon; etching the dielectric substance layer of the first resist pattern opening portion up to a second height; forming and patterning a second resist pattern thereon; etching the dielectric substance layer of the second resist pattern opening portion; and removing the second resist pattern.

Also, a tenth aspect of the invention of the present application provides a method for producing a scale, including the steps of, when forming a plurality of patterns each having different thicknesses on a single track of the scale by using a dielectric substance: forming a light reflection layer on a scale substrate; forming and patterning a first resist pattern thereon; lifting off a dielectric substance layer of a second height at the first resist pattern opening portion; removing the first resist pattern; forming and patterning a second resist pattern thereon; lifting off a dielectric substance layer of a first height at the second resist pattern opening portion; and removing the second resist pattern.

According to the present invention, for example, the INC pattern and ABS pattern are overlapped on the same single track, wherein the scale can be downsized.

In particular, where the first pattern is detected at the first optical wavelength at which reflection light attenuates by the dielectric substance layer of the first thickness, and the second pattern is detected at the second optical wavelength at which reflection light attenuates by the dielectric substance layer of the second thickness, the detection accuracy of the respective patterns can be improved since the respective patterns are not influenced by each other in respective pattern detection.

In addition, where a height of the dielectric substance layer is set so that the light quantity from the dielectric substance layer is minimized at the first optical wavelength and the light quantity from the dielectric substance layer is maximized at the second optical wavelength, there is no case where the respective patterns are influenced by each other when detecting the patterns.

BEST MODE FOR CARRYING OUT THE INVENTION

Hereinafter, a detailed description is given of an embodiment of the present invention.

Figure 5:
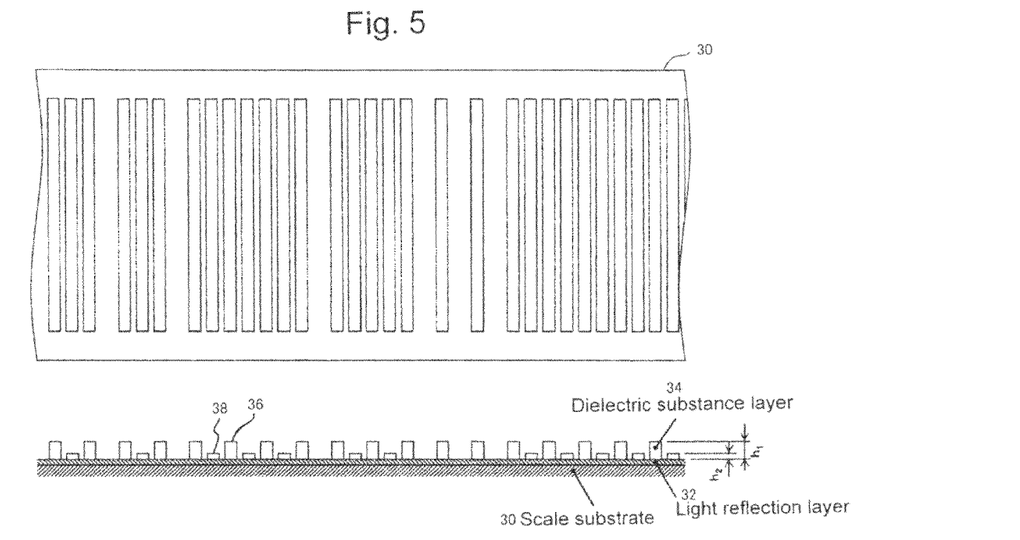
FIG. 5 are a plan view and a side view showing the configuration of a scale according to the present invention.

A scale used in the present embodiment separates an INC pattern and an ABS pattern from each other by controlling the thickness (heights) $h_1$ and $h_2$ of a dielectric substance layer 34 formed on a light reflection layer 32 formed on a scale substrate 30. For example, a pattern in which the thickness of the dielectric substance layer is $h_1$ can be made into an INC pattern 36, and a pattern in which the thickness of the dielectric substance layer is $h_2$ can be made into an ABS pattern 38.

Figure 6:
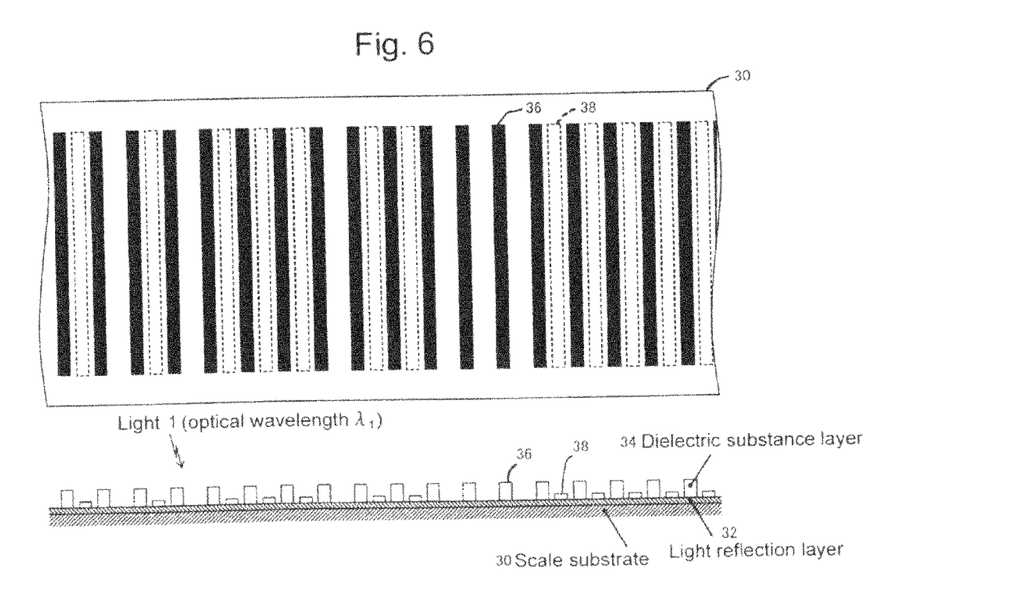
FIG. 6 are a plan view and a side view showing a case where the scale is observed at the first optical wavelength.
Figure 7:
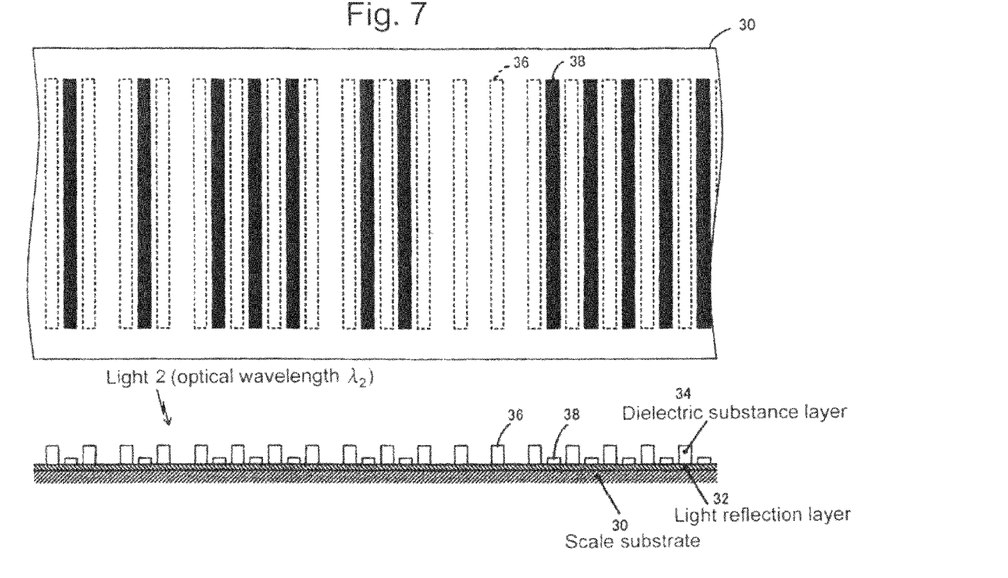
FIG. 7 are a plan view and a side view showing a case where the scale is observed at the second optical wavelength.

For example, silicon oxide ($SiO_2$), chrome oxide ($Cr_2O_3$), titanium nitride (TiN), etc., may be used as a material of the dielectric substance layer 34. Since a difference in thickness of the dielectric substance layer can be increased if silicon oxide is used, light separation can be facilitated, and a high-performance encoder can be attained. On the other hand, since the refractive index n of chrome oxide or titanium nitride is larger than that of silicon oxide, the thickness $h_1$ or $h_2$ is made smaller, where it becomes difficult to separate light although the cost thereof is decreased.

Where light is reflected through the dielectric substance layer, it has been known that light reflected from the surface layer of the dielectric substance layer interferes with light reflected by the light reflection layer in the dielectric substance layer and darkness is brought about at a specified optical wavelength. Therefore, for example, where it is assumed that the dielectric substance layer of thickness $h_1$ becomes dark when being observed at optical wavelength $\lambda_1$ and the dielectric substance layer of thickness $h_2$ becomes dark when being observed at optical wavelength $\lambda_2$, the patterns 36 and 38 shown in FIG. 5 can be observed at the respective optical wavelengths as shown in FIG. 6 and FIG. 7.

Figure 8:
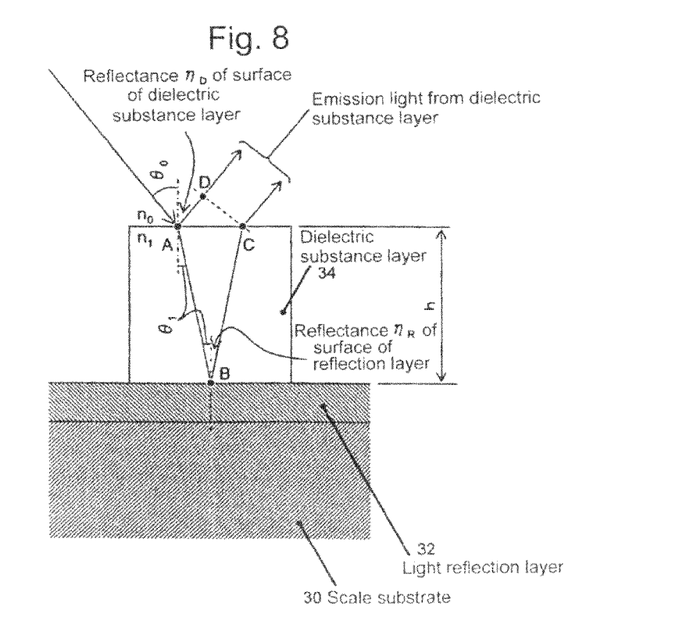
FIG. 8 is a sectional view showing interference of light emitted from a dielectric substance layer for description of the principle of the present invention.

Interference of light emitted from the dielectric substance layer attenuates where a difference in optical paths of light reflected from the surface of the dielectric substance layer and light reflected from the surface of the reflection layer inside the dielectric substance layer is half the optical wavelength, and is intensified where the difference is equivalent to an integral multiple. That is, according to Snell's law, $$n_r = n_1/n_0 = \sin\theta_0/\sin\theta_1 \qquad (1)$$

Here, $n_1$ is a refractive index of the dielectric substance layer, $n_0$ is a refractive index of the atmospheric air layer, $\theta_0$ is an incident angle from the atmospheric air layer into the dielectric substance layer, and $\theta_1$ is a refractive angle thereof.

The distances among respective points A, B, C and D are expressed by the following expressions.

$$L_{ABC} = 2h/\cos\theta_1 \quad (2)$$

$$L_{AC} = 2h\tan\theta_1 \quad (3)$$

$$L_{AD} = L_{AC}\sin\theta_0 = 2h\sin\theta_0\tan\theta_1 \quad (4)$$

Here, h is a thickness (height) of the dielectric substance layer. Therefore, the optical distance between A and C is expressed by the following expression.

$$LP_{ABC} = n_1 L_{ABC} = 2n_1 h/\cos\theta_1 \quad (5)$$

Also, the optical distance between A and D is expressed by the following expression.

$$LP_{AD} = n_0 L_{AD} = 2n_0 h\sin\theta_0\tan\theta_1 \quad (6)$$

Therefore, a difference in optical paths is expressed by the following expression.

$$\delta LP = LP_{ABC} - LP_{AD} \quad (7)$$
$$= 2h\{(n_1/\cos\theta_1) - n_0\sin\theta_0\tan\theta_1\}$$

Figure 9:
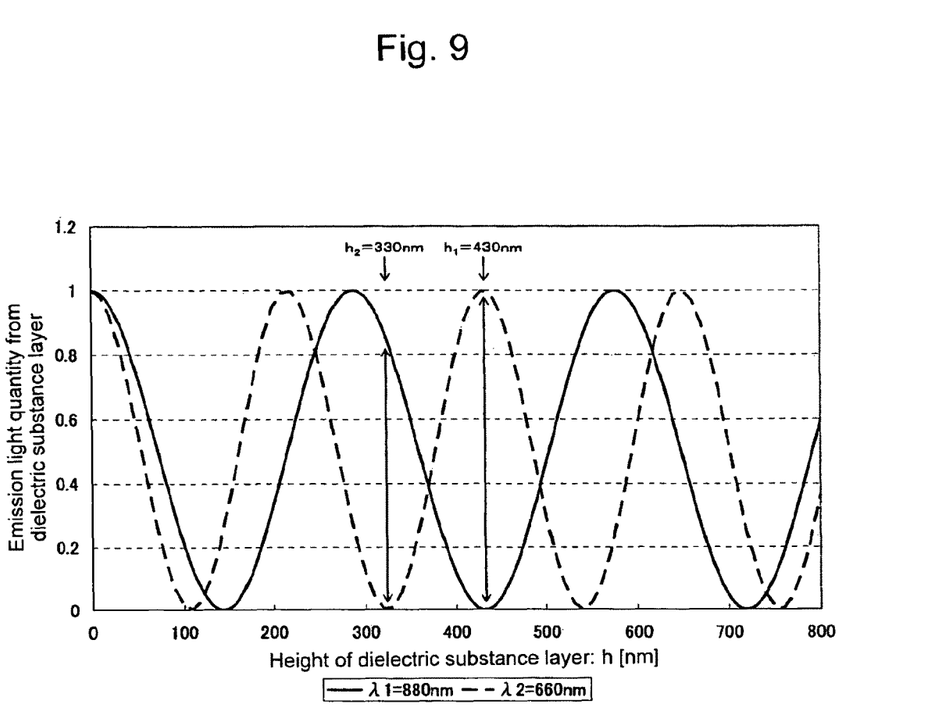
FIG. 9 is a view showing an example of emission light quantity from a dielectric substance layer for description of the principle of the present invention.

Here, FIG. 9 shows the relationship between the height h of the dielectric substance layer and the emission light intensity where $n_0 = 1$, $n_1 = 1.55$ (example of $SiO_2$), $\theta_0 = 15°$, $\lambda_1 = 880$ nm, $\lambda_2 = 660$ nm, and the reflectance of the respective sides is ideal ($\eta_D = 50\%$, $\eta_R = 100\%$), and where it is assumed that there is no attenuation in the layer. Based on FIG. 9, if 430 nm is selected as $h_1$, the emission light quantity of optical wavelength $\lambda_2$ (660 nm) can be maximized when the emission light quantity of optical wavelength $\lambda_1$ (880 nm) is the minimum, and if 330 nm is selected as $h_2$, the emission light quantity of optical wavelength $\lambda_1$ (880 nm) can be almost maximized when the emission light quantity of optical wavelength $\lambda_2$ (660 nm) is the minimum. By such selection, the influences by respective wavelengths can be minimized when observing at the respective wavelengths.

Figure 10:
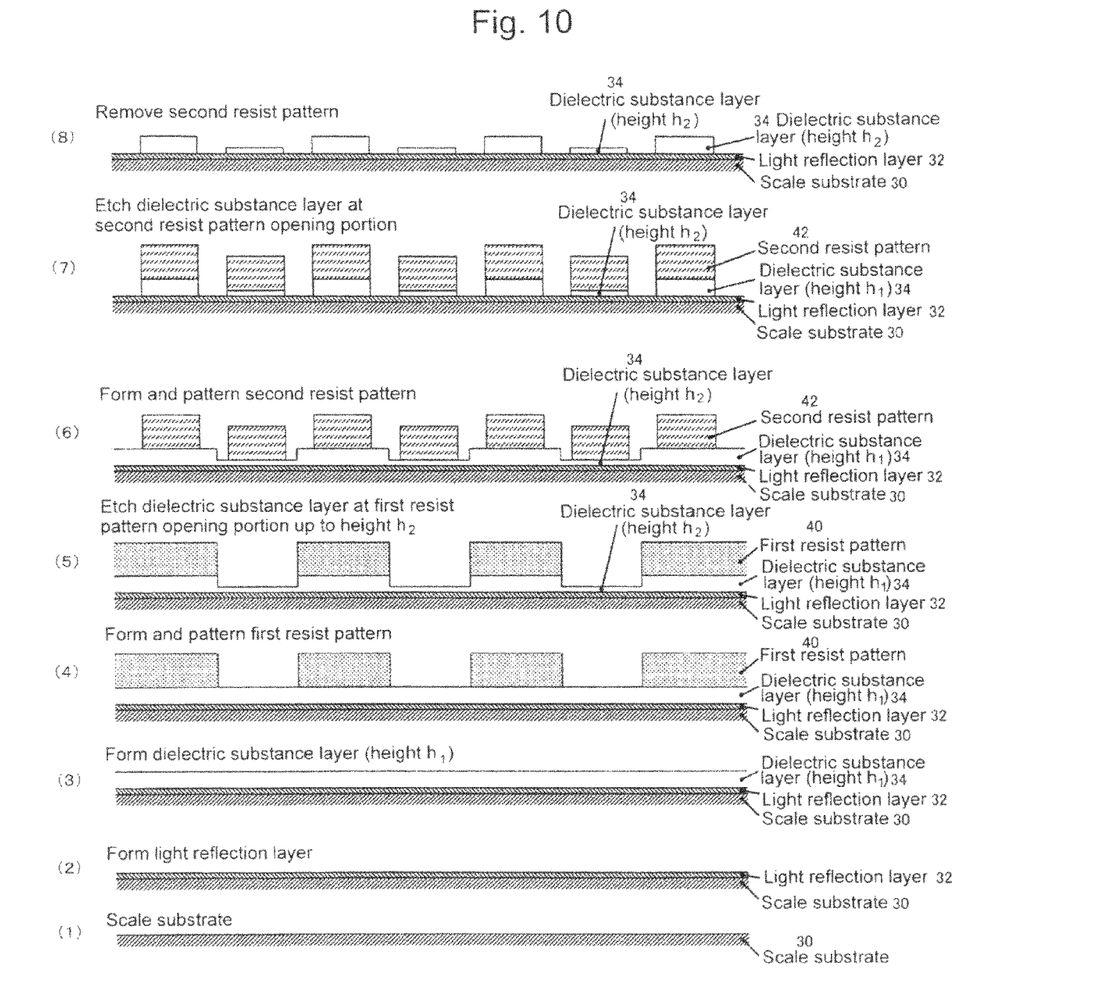
FIG. 10 is a view showing a process for producing a scale by an etching method according to the present invention.

Here, patterns having a dielectric substance layer of different height may be produced by a lithography process in which the height of the dielectric substance layer is controlled by an etching method as shown in, for example, FIG. 10.

That is, first, (1) a scale substrate 30 is prepared, (2) a light reflection layer 32 is formed on the scale substrate 30, (3) a dielectric substance layer 34 of height $h_1$ is formed thereon, (4) the first resist pattern 40 is formed thereon, and patterned, (5) the dielectric substance layer at the opening portion of the first resist pattern 40 is etched up to height $h_2$, next, (6) the second resist pattern 42 is formed and patterned, next, (7) the dielectric substance layer at the opening portion of the second resist pattern 42 is etched, and finally (8) the second resist pattern 42 is removed. Thus, a scale may be produced.

According to the method, one-time film formation is sufficient to form the scale, wherein the production cost is inexpensive.

Figure 11:
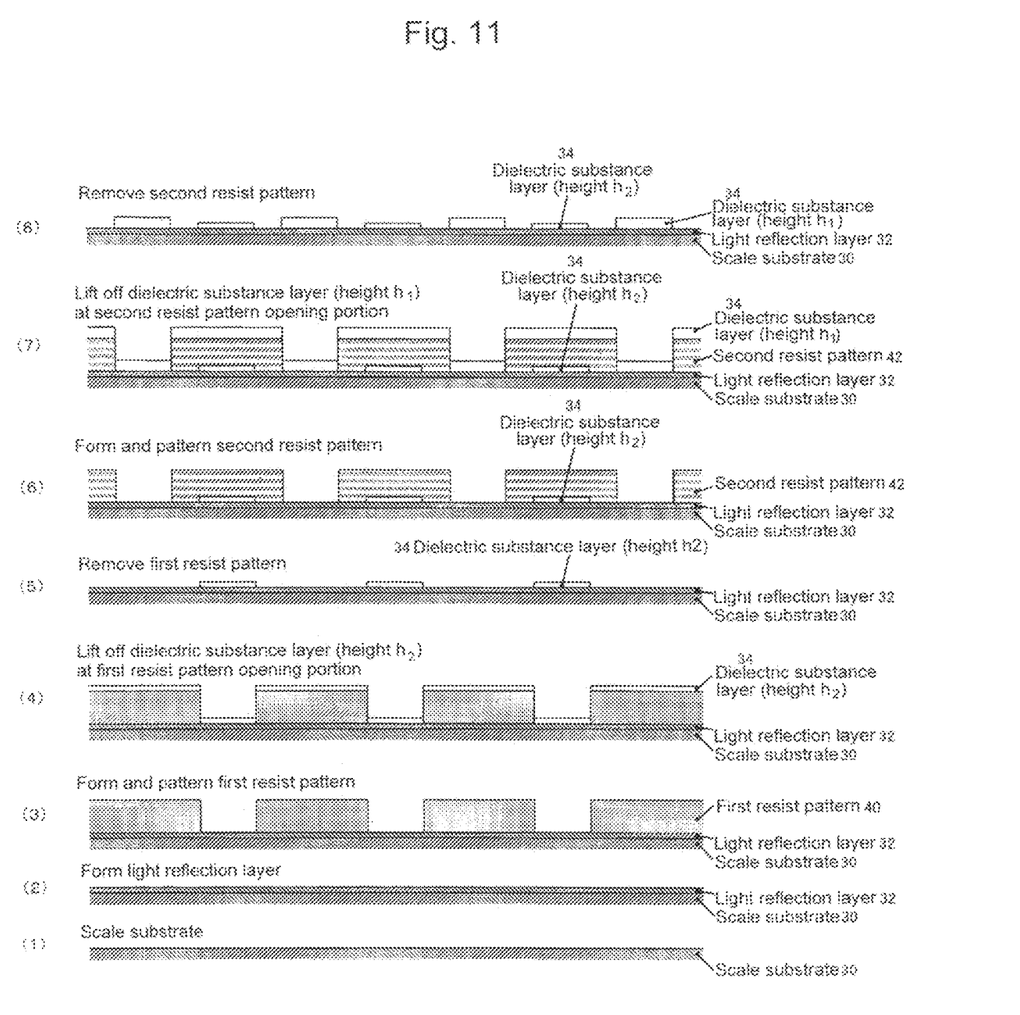
FIG. 11 is a view showing a process for producing a scale by a lift-off method according to the present invention.

Or, as shown in FIG. 11, the scale may be produced by a lithography process in which the height of the dielectric substance layer is controlled by a lift-off method.

That is, first, (1) a scale substrate 30 is prepared, (2) a light reflection layer 32 is formed on the scale substrate 30, (3) the first resist pattern 40 is formed and patterned thereon, (4) a dielectric substance layer of height $h_2$ is lifted off at the opening portion of the first resist pattern 40, next, (5) the first resist pattern 40 is removed, (6) the second resist pattern 42 is formed and patterned thereon, next (7) a dielectric substance layer of height $h_1$ is lifted off at the opening portion of the second resist pattern 42, and finally (8) the second resist pattern 42 is removed.

According to the method, since there is no process of scraping the surface, the surface is not roughened, wherein interference based on regular reflection can be made secure.

Figure 12:
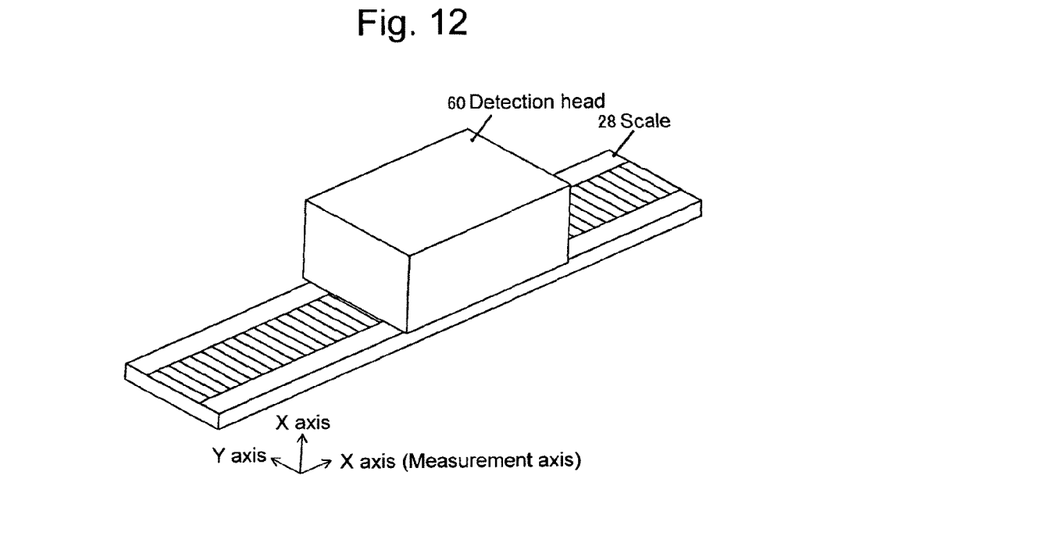
FIG. 12 is a perspective view showing the entire configuration of an embodiment of a reflection type encoder according to the present invention.

A reflection type encoder using a scale according to the present invention is composed, as shown in FIG. 12, of a scale 28 and a detection head 60 relatively moving thereon in the measurement axis (X-axis) direction.

Figure 13:
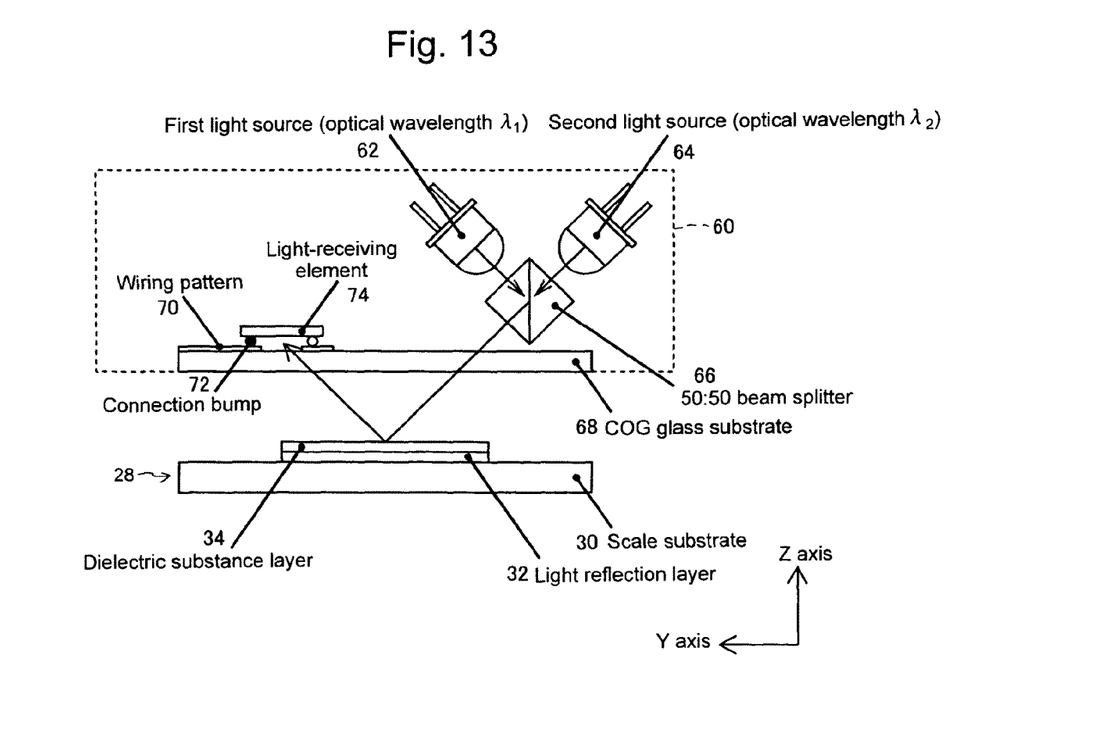
FIG. 13 is a sectional view showing a detailed configuration thereof.
Figure 14:
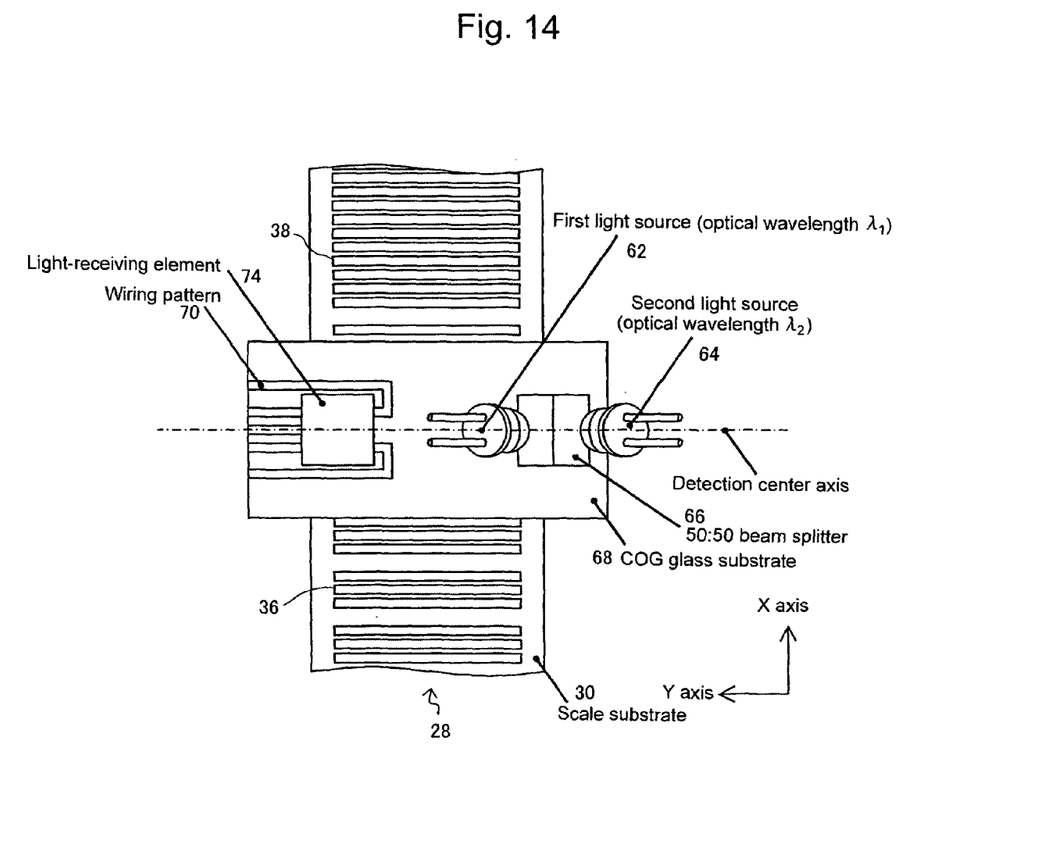
FIG. 14 is a plan view when the detection head there of is observed in the Z-axis direction.

The detection head 60 is provided, as shown in detail in FIG. 13 (sectional view) and in FIG. 14 (plan view), with the first light source 62 of optical wavelength $\lambda_1$, the second light source 64 of optical wavelength $\lambda_2$, a 50:50 beam splitter 66 for synthesizing the optical paths of two light sources 62 and 64, a COG (Chip on Glass) glass substrate 68 through which light synthesized by the beam splitter 66 passes, and a light-receiving element 74, which is connected to a wiring pattern 70, for example, on the COG glass substrate 68 by a connection bump 72 and is common to two optical wavelengths $\lambda_1$ and $\lambda_2$, for detecting light transmitted through the COG glass substrate 68 and reflected by the pattern of the scale 28.

In the present embodiment, the optical path of the first light source 62 (wavelength $\lambda_1$) and the optical path of the second light source (wavelength $\lambda_2$) are synthesized by the beam splitter 66 and reach the dielectric substance layer 34 on the scale substrate 30. The light reflected there is detected by the light-receiving element 74 connected to the wiring pattern 70 of the COG glass substrate 68 by the connection bump 72. The detection signal is transmitted to a control circuit portion (not illustrated) through the connection bump 72 and the wiring pattern 70.

Figure 15:
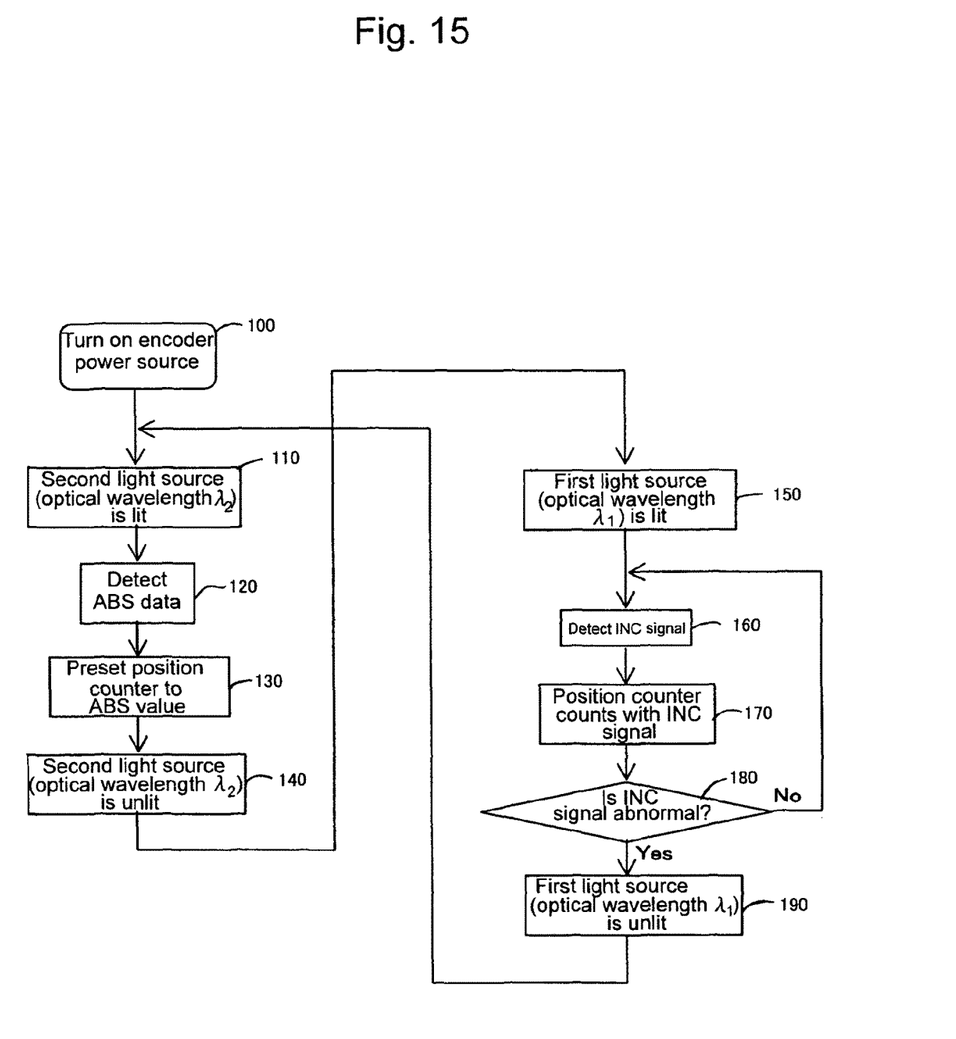
FIG. 15 is a flowchart showing a method for controlling the light source in the embodiment.

Here, the light sources 62 and 64 are controlled in the procedure shown in FIG. 15. That is, since the present position is not clear when the power of the encoder is turned on (Step 100), it is necessary to read the ABS pattern 38 and to detect the ABS data. Therefore, the second light source 64 is lit (Step 110). At this time, the first light source 62 remains unlit.

After the ABS data is detected (Step 120), the data is preset in a position counter (Step 130), and the second light source 64 is unlit (Step 140).

Next, the first light source 62 is lit (Step 150), and an INC signal is detected (Step 160). A change in the position thereafter is detected by counting the INC signal by means of a position counter (Step 170).

Since the reliability of the position counter data thereafter is lowered where there is any abnormality in the INC signal, for example, a lowering in the signal intensity, during measurement of the INC signal (Step 180), the first light source 52 is unlit (Step 190), and a routine of detecting the ABS data is re-started (Steps 110 through 140).

As described above, since the ABS data and the INC signal can be detected by a single light-receiving element 74, the configuration can be downsized. Also, as shown in FIG. 14, the detection center axis of the ABS pattern 38 is in agreement with the detection center axis of the INC pattern 36. Therefore, since the ABS detection position and INC detection position on the scale can be made into the same position, there is no case where the ABS data position deviates from the INC signal position, wherein there is no case where both detect different positions, and therefore the reliability of position detection is improved.

In addition, in the above-described embodiment, although the INC pattern and the ABS pattern are formed on a single track, the number of patterns formed on a single track and combination thereof are not limited thereto. For example, two types of ABS patterns or INC patterns may be combined or three or more types of patterns may be combined.

INDUSTRIAL APPLICABILITY

The present invention may be applicable to a photoelectric type encoder such as a linear encoder and a rotary encoder, and can downsize the scale thereof by overlapping a plurality of patterns such as INC patterns and ABS patterns on the same track.

The invention claimed is:

1. A scale of a reflection type encoder comprising:
  a plurality of sets of patterns each having a same thickness in the same set but different thicknesses between different sets formed on a single track thereof using a dielectric substance, wherein the dielectric substance layer has regions of different height, such that when at least one light source emits a plurality of wavelengths, each of the plurality of wavelengths is configured to illuminate a different region of the regions of different height to provide distinct positional reference information.

2. The scale of a reflection type encoder according to claim 1, wherein the at least one light source is a plurality of light sources, each of the plurality of light sources emitting at least one of the plurality of wavelengths.

3. The scale of a reflection type encoder according to claim 1, wherein the at least one light source is a single light source.

4. A reflection type encoder, which receives a plurality of light-receiving signals from a single scale, including:
  at least one light source;
  a scale having a plurality of sets of patterns formed thereon to which light is irradiated from the at least one light source; and
  a light-receiving element for receiving light reflected from each of the plurality of sets of patterns, wherein
  a plurality of sets of patterns each having a same thickness in the same set but different thicknesses between different sets are formed on a single track of the scale by using a dielectric substance, light of a plurality of wavelengths each having a different brightness in accordance with a different thickness of the dielectric substance is irradiated from the at least one light source, and light-receiving signals are obtained for each respective set of patterns having a same thickness of the dielectric substance, and
  wherein the dielectric substance layer has regions of different height and each of the plurality of wavelengths of the at least one light source is configured to interact with a different region of the regions of different height to provide distinct positional reference information.

5. The reflection type encoder according to claim 4, wherein the encoder detects a first pattern set at a first optical wavelength at which reflection light is attenuated by a dielectric substance layer of a first thickness, and detects a second pattern set at a second optical wavelength at which reflection light is attenuated by a dielectric substance layer of a second thickness.

6. The reflection type encoder according to claim 5, wherein a height of the dielectric substance layer is set so that a light quantity from the dielectric substance layer is minimized at the first optical wavelength and the light quantity from the dielectric substance layer is maximized at the second optical wavelength.

7. The reflection type encoder according to claim 4, wherein the plurality of sets of patterns include an incremental pattern set and an ABS pattern set.

8. The reflection type encoder according claim 7, wherein a detection center axis of the light-receiving element for detecting the incremental pattern set is in agreement with a detection center axis of the light-receiving element for detecting the ABS pattern set on the measurement axis.

9. The reflection type encoder according to claim 4, wherein the dielectric substance is silicon oxide.

10. The reflection type encoder according to claim 9, wherein the thicknesses of the dielectric substance are 430 nm and 330 nm, and the plurality of irradiated wavelengths of the at least one light source are 880 nm and 660 nm.

11. A reflection type encoder according to claim 4, wherein one of the plurality of sets of patterns having the same thickness are spaced from another of the plurality of sets of patterns having the different thicknesses.

12. The reflection type encoder according to claim 4, wherein the at least one light source is a plurality of light sources, each of the plurality of light sources emitting at least one of the plurality of wavelengths.

13. The reflection type encoder according to claim 4, wherein the at least one light source is a single light source.

14. A method for producing a scale, comprising the steps of, when forming a plurality of sets of patterns each having a same thickness in the same set but different thicknesses between the different sets on a single track of the scale by using a dielectric substance:
  forming a light reflection pattern on a scale substrate;
  forming a dielectric substance layer with a first height thereon;
  forming and patterning a first resist pattern thereon;
  etching the dielectric substance layer of the first resist pattern opening portion up to a second height;
  forming and patterning a second resist pattern thereon;
  etching the dielectric substance layer of the second resist pattern opening portion; and
  removing the second resist pattern, wherein
    the first height is configured to interact with a wavelength emitted from at least one light source emitting a plurality of wavelengths, and
    the second height is configured to interact with another wavelength emitted from the at least one light source emitting the plurality of wavelengths, such that the interactions provide distinct positional reference information.

15. A method for producing a scale according to claim 14, wherein the second resist pattern is formed on a portion of the dielectric substance layer having the second height.

16. The method for producing a scale according to claim 14, wherein the at least one light source is a plurality of light sources, each of the plurality of light sources emitting at least one of the plurality of wavelengths.

17. The method for producing a scale according to claim 14, wherein the at least one light source is a single light source.

18. A method for producing a scale, comprising the steps of, when forming a plurality of sets of patterns each having a same thickness in the same set but different thicknesses between different sets on a single track of the scale by using a dielectric substance:
  forming a light reflection layer on a scale substrate;
  forming and patterning a first resist pattern thereon;
  lifting off a dielectric substance layer of a second height at the first resist pattern opening portion;
  removing the first resist pattern;

forming and patterning a second resist pattern thereon;
lifting off a dielectric substance layer of a first height at the second resist pattern opening portion; and
removing the second resist pattern, wherein
  the first height is configured to interact with a wavelength emitted from at least one light source emitting a plurality of wavelengths, and
  the second height is configured to interact with another wavelength emitted from the at least one light source emitting the plurality of wavelengths, such that the interactions provide distinct positional reference information.

19. The method for producing a scale according to claim 18, wherein the at least one light source is a plurality of light sources, each of the plurality of light sources emitting at least one of the plurality of wavelengths.

20. The method for producing a scale according to claim 18, wherein the at least one light source is a single light source.

* * * * *